United States Patent
Gong et al.

(10) Patent No.: US 12,141,228 B2
(45) Date of Patent: Nov. 12, 2024

(54) DEEP LEARNING PROCESSING APPARATUS AND METHOD, DEVICE AND STORAGE MEDIUM

(71) Applicant: Beijing Baidu Netcom Science and Technology Co., Ltd., Beijing (CN)

(72) Inventors: Xiaozhang Gong, Beijing (CN); Jian Ouyang, Beijing (CN); Jing Wang, Beijing (CN); Wei Qi, Beijing (CN)

(73) Assignee: Beijing Baidu Netcom Science and Technology Co., Ltd., Beijing (CN)

( * ) Notice: Subject to any disclaimer, the term of this patent is extended or adjusted under 35 U.S.C. 154(b) by 1028 days.

(21) Appl. No.: 17/017,600

(22) Filed: Sep. 10, 2020

(65) Prior Publication Data
US 2021/0241095 A1 Aug. 5, 2021

(30) Foreign Application Priority Data
Feb. 5, 2020 (CN) .......................... 202010080940.1

(51) Int. Cl.
*G06F 17/16* (2006.01)
*G06F 7/544* (2006.01)

(52) U.S. Cl.
CPC ............ *G06F 17/16* (2013.01); *G06F 7/5443* (2013.01)

(58) Field of Classification Search
CPC .. G06N 3/08; G06N 3/084; G06F 17/15–153; G06F 17/16
See application file for complete search history.

(56) References Cited

U.S. PATENT DOCUMENTS

2015/0006444 A1  1/2015  Tamatsu et al.
2017/0316312 A1  11/2017 Goyal et al.
(Continued)

FOREIGN PATENT DOCUMENTS

CN  107341547 A  11/2017
CN  109190756 A  1/2019
(Continued)

OTHER PUBLICATIONS

Extended European Search Report for Application No. EP 20196107. 5, dated Apr. 6, 2021 (12 pages).
(Continued)

*Primary Examiner* — Matthew D Sandifer
(74) *Attorney, Agent, or Firm* — Ice Miller LLP; Justin D. Swindells (57) ABSTRACT

Embodiments of the present disclosure propose a deep learning processing apparatus and method, device and storage medium, relating to the field of artificial intelligence. A deep learning processing apparatus includes: at least one matrix multiply-add module, configured to perform a matrix multiply-add operation of a convolution kernel parameter value matrix of a convolutional layer in a convolutional neural network and a first error gradient value matrix to obtain a plurality of intermediate matrices; a storage apparatus, configured to store the plurality of intermediate matrices without reshaping elements in the plurality of intermediate matrices; and a plurality of matrix accumulation modules, configured to read the plurality of intermediate matrices from the storage apparatus and perform a matrix accumulation operation based on the plurality of intermediate matrices according to a convolution scheme of the convolutional layer in parallel, to obtain a second error gradient value matrix for the convolutional layer.

17 Claims, 7 Drawing Sheets

(56) References Cited

U.S. PATENT DOCUMENTS

| | | | |
|---|---|---|---|
| 2018/0004515 A1 | 1/2018 | Yamamura et al. | |
| 2018/0005113 A1 | 1/2018 | Kasagi | |
| 2018/0157969 A1 | 6/2018 | Xie et al. | |
| 2019/0065958 A1 | 2/2019 | Guo | |
| 2019/0065959 A1* | 2/2019 | Chen | G06N 3/048 |
| 2019/0279087 A1 | 9/2019 | Uchida et al. | |
| 2020/0111007 A1 | 4/2020 | Chen et al. | |
| 2022/0036189 A1* | 2/2022 | Courville | G06N 3/082 |

FOREIGN PATENT DOCUMENTS

| | | |
|---|---|---|
| EP | 3451241 A1 | 3/2019 |
| JP | 2015011510 A | 1/2015 |
| JP | 2018005369 A | 1/2018 |
| JP | 2018005420 A | 1/2018 |
| JP | 2020013412 A | 1/2020 |
| KR | 20190004306 A | 1/2019 |
| WO | 2018131409 A1 | 7/2018 |

OTHER PUBLICATIONS

D. Scherer et al.; "Accelerating Large-Scale Convolutional Neural Networks with Parallel Graphics Multiprocessors"; Artificial Neural Networks—ICANN 2010, Springer Berlin Heidelberg, pp. 82-91; Sep. 15, 2010; XP019152555; ISBN: 978-3-642-15824-7 (10 pages).

* cited by examiner

DEEP LEARNING PROCESSING APPARATUS AND METHOD, DEVICE AND STORAGE MEDIUM

CROSS-REFERENCE TO RELATED APPLICATIONS

This application claims priority to Chinese Application No. 202010080940.1, filed on Feb. 5, 2020 and entitled "Deep Learning Processing Apparatus and Method, Device and Storage Medium," the entire disclosure of which is hereby incorporated by reference.

TECHNICAL FIELD

Embodiments of the present disclosure relate generally to the field of data processing, and more specifically, to the field of artificial intelligence.

BACKGROUND

Deep learning is a research direction of artificial neural networks. In recent years, with the constant improvement of hardware and software in the field of artificial intelligence, deep learning technology develops rapidly. Deep learning technology may be applied in various fields, such as computer vision, natural language processing, or audio analysis. Convolutional neural network (CNN) is an influential network model in deep learning technology, especially suitable for applications involving images and text data. Calculations involved in CNN mainly include convolution calculation, fully connected (FC) calculation, pooling calculation, vector calculation, activation calculation, etc., where the most important calculation is the convolution operation. In the CNN training process, in order to achieve model optimization, in addition to using training data to perform forward calculation, a backward propagation approach may also be used to optimize parameters of the model.

In the CNN training process, a large number of convolution operations and convolution inverse operations are all involved. In some CNN architectures, convolution operations and convolution inverse operations may occupy most of the computing resources and time of an entire architecture operation. A deep learning processor may be used to implement deep learning calculations and may support deep learning network training. It is expected that the deep learning processor can process convolution operations and/or convolution inverse operations more rapidly and efficiently, which may help accelerate the training of the entire deep learning network, especially CNN.

SUMMARY

According to embodiments of the present disclosure, a scheme for performing deep learning processing is provided.

In a first aspect, an embodiment of the present disclosure provides a deep learning processing apparatus. The deep learning processing apparatus includes: at least one matrix multiply-add module, configured to perform a matrix multiply-add operation of a convolution kernel parameter value matrix of a convolutional layer in a convolutional neural network and a first error gradient value matrix to obtain a plurality of intermediate matrices; a storage apparatus, configured to store the plurality of intermediate matrices without reshaping elements in the plurality of intermediate matrices; and a plurality of matrix accumulation modules, configured to read the plurality of intermediate matrices from the storage apparatus and perform a matrix accumulation operation based on the plurality of intermediate matrices according to a convolution scheme of the convolutional layer in parallel, to obtain a second error gradient value matrix for the convolutional layer.

In a second aspect, an embodiment of the present disclosure provides a method for performing deep learning processing. The method includes: causing at least one matrix multiply-add module of a deep learning processing apparatus to perform a matrix multiply-add operation of a convolution kernel parameter value matrix of a convolutional layer in a convolutional neural network and a first error gradient value matrix to obtain a plurality of intermediate matrices; storing the plurality of intermediate matrices to a storage apparatus without reshaping elements in the plurality of intermediate matrices; reading the plurality of intermediate matrices from the storage apparatus; and causing a plurality of matrix accumulation modules of the deep learning processing apparatus to perform a matrix accumulation operation based on the plurality of intermediate matrices according to a convolution scheme of the convolutional layer in parallel, to obtain a second error gradient value matrix for the convolutional layer.

In a third aspect, an embodiment of the present disclosure provides an electronic device. The electronic device includes: at least one deep learning processing apparatus according to the first aspect; and at least one general-purpose processing apparatus, coupled to the at least one deep learning processing apparatus and configured to provide the at least one deep learning processing apparatus with an instruction for performing training of a convolutional neural network CNN.

In a fourth aspect, an embodiment of the present disclosure provides a computer readable storage medium. The computer readable storage medium stores a computer program thereon, where the computer program, when executed by a processor, implements the method according to the second aspect.

It should be appreciated that the description of the Summary is not intended to limit the key or important features of embodiments of the present disclosure, or to limit the scope of the present disclosure. Other features of the present disclosure will become readily comprehensible through the following description.

BRIEF DESCRIPTION OF THE DRAWINGS

The above and other features, advantages and aspects of various embodiments of the present disclosure will become more apparent with reference to the accompanying drawings and detailed descriptions below. The same or similar reference numerals in the drawings denote the same or similar elements.

DETAILED DESCRIPTION OF EMBODIMENTS

Embodiments of the present disclosure will be described in more detail below with reference to the accompanying drawings. Although some embodiments of the present disclosure are shown in the drawings, it should be appreciated that the present disclosure may be implemented in various forms and should not be construed as limited to embodiments described here, and these embodiments are provided in turn for more thorough and complete understanding of the present disclosure. It should be understood that the drawings and embodiments of the present disclosure are merely illustrative, but are not intended to limit the scope of the present disclosure.

In the description of embodiments of the present disclosure, the term "include" and the like should be interpreted as open inclusion, i.e., "include but not limited to". The term "based on" should be interpreted as "at least partially based on". The term "one embodiment" or "the embodiment" should be interpreted as "at least one embodiment". The terms "first", "second" and the like may indicate different or identical objects. Other explicit and implicit definitions may also be included below.

As mentioned above, in the training and inference process of convolutional neural networks (CNN), it is necessary to deal with very complicated operations, especially the convolution operation and inversed convolution operation of a convolutional layer. If a general-purpose processor is used to perform the training or inference of CNN, the processing efficiency is very low. At present, some schemes use a graphics processing unit (GPU) to implement CNN processing, especially CNN training. GPU uses a single instruction multi-threading (SIMT) technology to schedule and implement operations through a large number of threads, which may improve a calculation speed. However, GPU requires a large number of register files, a complex thread scheduling mechanism and cache management, resulting in high power consumption and poor performance in calculations. Therefore, it is desirable to provide a more efficient processing apparatus for deep learning processing, especially for CNN related processing.

Before introducing a processing apparatus for CNN related processing, first, CNN is briefly introduced. CNN is a deep learning model. The values of a parameter set used for processing in the deep learning model are determined through a training process. A machine learning model uses the trained parameter set to map a received input to a corresponding output. Therefore, the training process of the machine learning model may be considered as learning the mapping or association relationship from input to output from training data.

Figure 1:
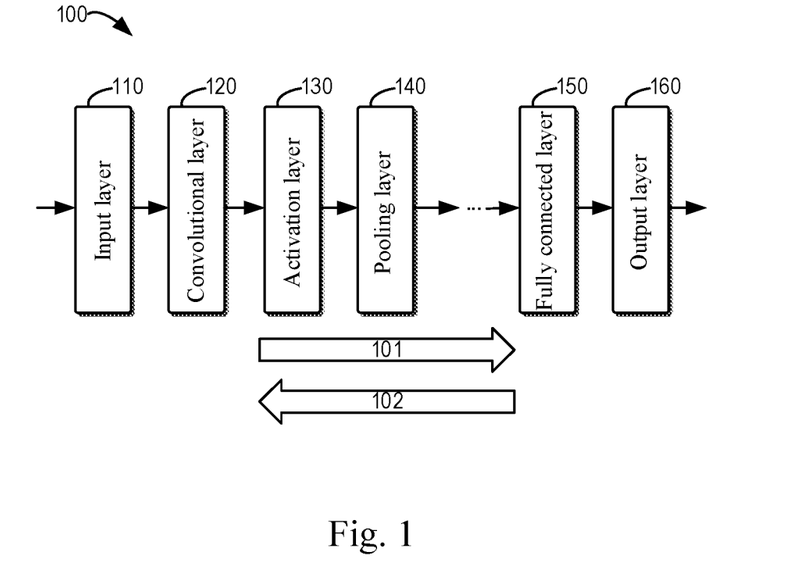
FIG. 1 schematically shows a block diagram of a structure of an example convolutional neural network (CNN)

CNN may generally include an input layer, a convolutional layer, a pooling layer, an activation layer, a fully connected layer, and an output layer. Depending on the specific processing task requirements and configurations, the numbers of convolutional layers, pooling layers, activation layers and fully connected layers, and connection relationships therebetween, etc. in CNN may all vary. FIG. 1 shows an example of the structure of CNN 100, which shows an input layer 110, a convolutional layer 120, an activation layer 130, a pooling layer 140, . . . , and a fully connected layer 150 and an output layer 160. An input to be processed by the model is provided as the input layer 110 to CNN 100 for processing. In a forward 101 processing, the input data is processed through a plurality of layers between the input layer and the output layer, and finally an output result of the output layer 160 is obtained.

In the training process of CNN 100, the training data need to be processed in the forward 101 processing and also be processed in an inverse 102 processing. In the inverse 102 processing, an error between an output obtained by processing the input training data under the condition of the current value of the parameter set of CNN 100 and an ideal output is usually calculated, and then the error is propagated in the opposite direction (i.e., direction from the output layer 160 to the input layer 110). In the back-propagation process, the gradient descent algorithm may be relied upon to adjust the current values of the parameters of the various layers in CNN 100. According to a plurality of rounds of training, the error between the output of CNN 100 and the ideal output may become smaller and smaller, until the model converges. The training process is complete.

It should be understood that the structure of CNN of FIG. 1 is only an example. In practical applications, CNN may have any other network configuration as needed, and may have more network layers, other types of network layers, and different connection relationships of various types of network layers. Embodiments of the present disclosure are not limited in this regard.

Figure 2:
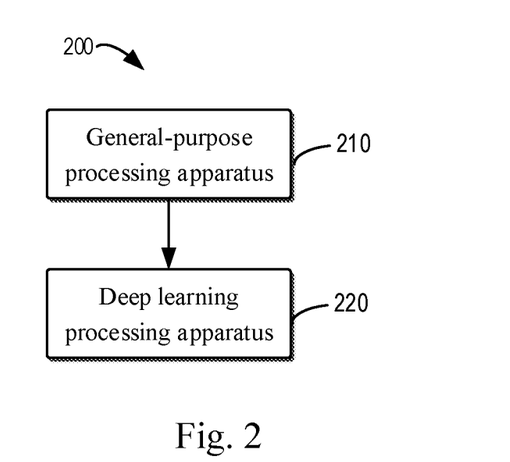
FIG. 2 schematically shows a block diagram of an example processing architecture according to some embodiments.

In some embodiments, a dedicated deep learning processor may be used to deal with CNN training related operations. FIG. 2 shows a schematic diagram of an example processing architecture 200 according to some embodiments. The example processing architecture 200 is a heterogeneous architecture, including a general-purpose processing apparatus 210 and a deep learning processing apparatus 220 coupled thereto.

The general-purpose processing apparatus 210 may include, for example, one or more general-purpose processor (CPU) cores, one or more digital signal processor (DSP) cores, or the like. The general-purpose processing apparatus 210 may be a general-purpose scalar processor, for example. The general-purpose processing apparatus 210 may execute general computer instructions, such as reduced instruction set computer (RISC) type instructions, and may also parse and execute customized instructions related to deep learning processing.

The general-purpose processing apparatus 210 may provide the instructions related to deep learning processing to the deep learning processing apparatus 220 for implementing related processing of the deep learning model.

The deep learning processing apparatus 220 (sometimes also referred to as a deep learning processor, or a deep learning processing device) may be, for example, a dedicated deep learning coprocessor, including software components and hardware circuits for implementing deep learning calculations. The deep learning processing apparatus 220 may be implemented by, for example, a field programmable gate array (FPGA), an application specific integrated circuit (ASIC), or the like. The deep learning processing apparatus 220 includes a plurality of modules, and operations of the plurality of modules are scheduled through related instructions defined for deep learning, and data interaction may also be performed between the plurality of modules. The modules in the deep learning processing apparatus 220 may be configured according to to-be-implemented deep learning processing tasks. In some implementations, the deep learning processing apparatus 220 may be configured to perform CNN training tasks. In such implementations, the general-purpose processing apparatus 210 provides the deep learning processing apparatus 220 with corresponding instructions for performing the CNN training.

As mentioned above, the CNN training process involves a large number of convolution operations and convolution inverse operations of the convolutional layer, which consumes a lot of computing resources and time. Therefore, improvements in terms of convolution operations and convolution inverse operations may be able to significantly accelerate CNN training.

According to an example embodiment of the present disclosure, a deep learning processing apparatus is proposed. The deep learning processing apparatus can perform a convolution direction operation of the convolutional layer. The deep learning processing apparatus includes one or more matrix multiply-add modules, configured to perform a matrix multiply-add operation of a convolution kernel parameter value matrix of a convolutional layer in CNN and a first error gradient value matrix to obtain a plurality of intermediate matrices. The plurality of intermediate matrices is stored into a storage apparatus without reshaping. The deep learning processing apparatus further includes a plurality of matrix accumulation modules, configured to read the plurality of intermediate matrices from the storage apparatus and perform a matrix accumulation operation based on the plurality of intermediate matrices according to a convolution scheme of the convolutional layer in parallel, to obtain a second error gradient value matrix for the convolutional layer. In this scheme, in the CNN training process, the matrix multiply-add operation and the matrix accumulation operation are implemented by specific modules. The plurality of matrix accumulation modules can perform operations in parallel, which may significantly improve the calculation efficiency of convolution inverse operations, and improve the calculation speed and reduce the power consumption.

Figure 3A:
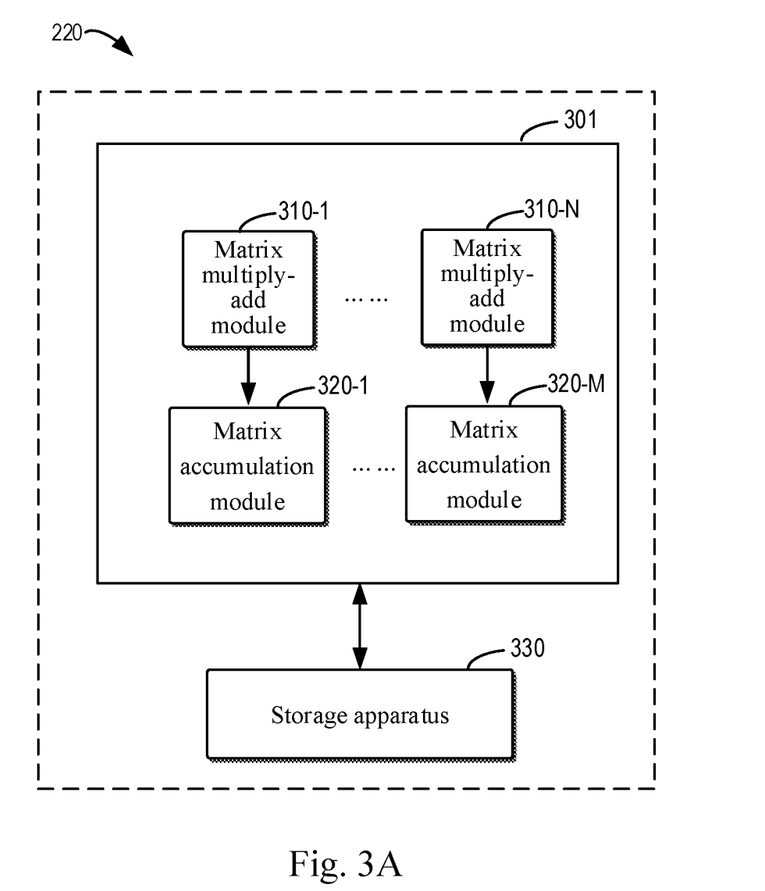
FIG. 3A is a block diagram schematically illustrating an example structure of a deep learning processing apparatus according to some example embodiments of the present disclosure.

FIG. 3A illustrates an example structure of a deep learning processing apparatus according to some example embodiments of the present disclosure. The deep learning processing apparatus may be the deep learning processing apparatus 220, which includes a matrix calculation module 301, for implementing matrix related calculations of the convolutional layer in CNN. The matrix calculation module 301 includes one or more matrix multiply-add modules 310-1, . . . 310-N, where N may be an integer greater than or equal to 1. For convenience of discussion, the matrix multiply-add modules 310-1, . . . 310-N may be collectively or individually referred to as a matrix multiply-add module 310. One or more matrix multiply-add modules 310 are configured to implement the matrix multiply-add operation of the convolution kernel parameter value matrix of the convolutional layer in CNN and the first error gradient value matrix. The matrix multiply-add operation of the convolutional layer may generate a plurality of intermediate matrices.

The matrix calculation module 301 further includes a plurality of matrix accumulation modules 320-1, . . . 320-M, where M may be an integer greater than or equal to 2. For convenience of discussion, the matrix accumulation modules 320-1, . . . 320-M may be collectively or individually referred to as a matrix accumulation module 320. These matrix accumulation modules 320 are configured to perform the matrix accumulation operation based on the plurality of intermediate matrices according to the convolution scheme of the convolutional layer in parallel, to obtain an error gradient value matrix for the current convolutional layer (also referred to as "second error gradient value matrix").

In operation, the plurality of intermediate matrices generated by the matrix multiply-add operation are stored into a storage apparatus 330 of the deep learning processing apparatus 220. The storage apparatus 330 may be an on-chip storage apparatus, for example, an on-chip random access memory (RAM), such as a static random access memory (SRAM) or other types of memory. The plurality of intermediate matrices may not be generated at the same time, so that whenever the matrix multiply-add module 310 generates a corresponding intermediate matrix, the intermediate matrix is stored in a corresponding storage location of the storage apparatus 330. In some embodiments, if there are a plurality of matrix multiply-add modules 310, the plurality of matrix multiply-add modules 310 may perform the matrix multiply-add operation of the convolution kernel parameter value matrix and the first error gradient value matrix in parallel.

In some embodiments, the matrix calculation module 301 may further include an instruction processing module 340, configured to receive instructions for operations of the modules in the matrix calculation module 301. Such an instruction set may be, for example, a customized deep learning instruction set, including an instruction set for the convolution direction operation of the convolutional layer in CNN. The instruction processing module 340 may obtain the instruction set from the general-purpose processing apparatus 210 coupled to the deep learning processing apparatus 220, for example. The instruction processing module 340 may parse the instruction set into instructions executable by the deep learning processing apparatus 220.

Figure 3B:
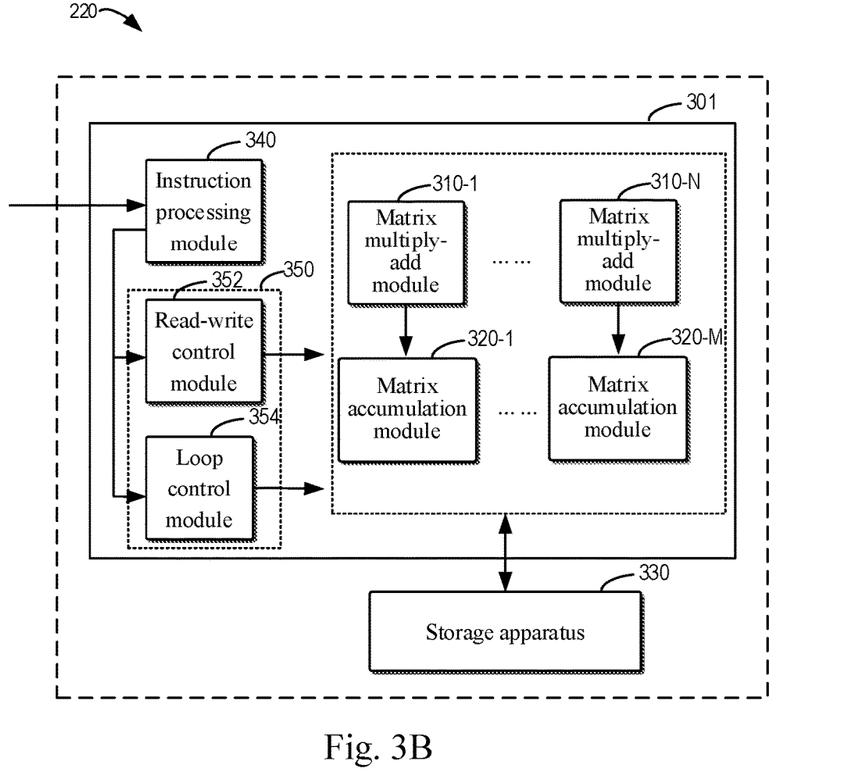
FIG. 3B is a block diagram schematically illustrating an example structure of a deep learning processing apparatus according to some other example embodiments of the present disclosure.

In some embodiments, the matrix calculation module 301 may further include a module related to instruction parsing and control signal generation. As shown in FIG. 3B, the matrix calculation module 301 may further include a control signal generation module 350, configured to generate a control signal for at least one matrix multiply-add module 310 and a plurality of matrix accumulation modules 320 based on the parsed instruction set, to control corresponding operations of the at least one matrix multiply-add module 310 and the plurality of matrix accumulation modules 320. In the example of FIG. 3B, the control signal generation module 350 includes a read-write control module 352, configured to read and write the control signal based on the parsed instruction set. The read-write control signal is used to control the reading and writing of data in the storage apparatus 330 for the at least one matrix multiply-add module 310 and the plurality of matrix accumulation modules 320. The control signal generation module 350 may further include a loop control module 354. When the matrix multiply-add module 310 is to perform the matrix multiply-add operation multiple times in a loop and/or the matrix accumulation modules 320 are to perform the matrix accumulation operation multiple times in a loop, the loop control module 354 is configured to generate a loop control signal based on the parsed instruction set, used to control the loop of the matrix multiply-add operation of each matrix multiply-add module 310, and/or control the loop of the matrix accumulation operation of each matrix accumulation module 320.

Figure 3C:
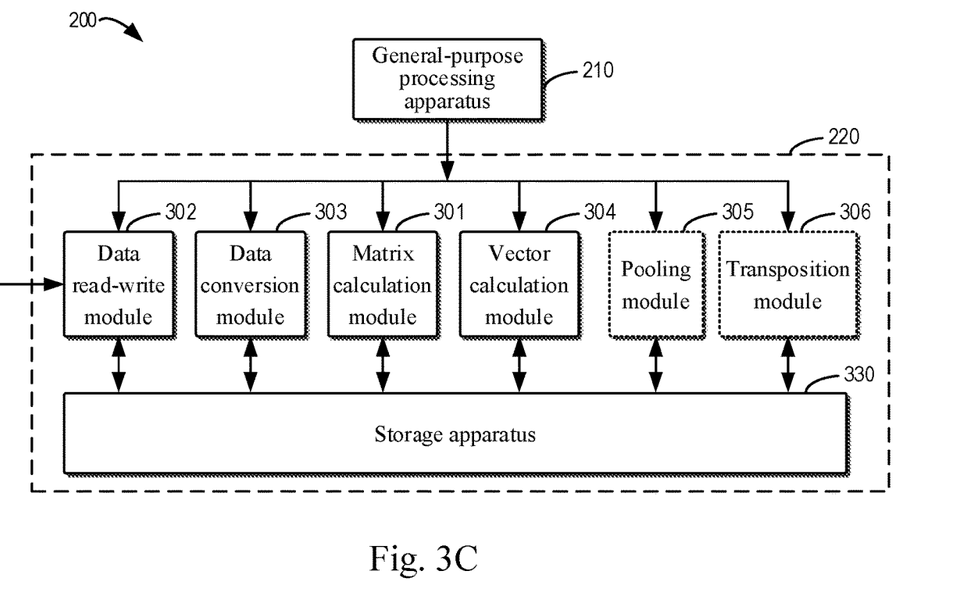
FIG. 3C is a block diagram schematically illustrating an example structure of a deep learning processing apparatus according to still other example embodiments of the present disclosure.

Some example embodiments of the matrix calculation module 301 in the deep learning processing apparatus 220 are generally described above with reference to FIGS. 3A and 3B. In some embodiments, the deep learning processing apparatus 220 may further include other modules for implementing CNN training tasks together with the matrix calculation module 301. FIG. 3C shows an example structure of the deep learning processing apparatus 220 according to some embodiments of the present disclosure. As shown in FIG. 3C, in addition to the matrix calculation module 301, the deep learning processing apparatus 220 further includes a data read-write module 302, a data conversion module 303, a vector calculation module 304, and possibly a pooling module 305 and a transposition module 306. In addition to the matrix calculation module 301, both the vector calculation module 304 and possibly the pooling module 305 and the transposition module 306 may access the storage apparatus 330 to read to-be-processed data therefrom and write the processed data to the storage apparatus 330. Therefore, the storage apparatus 330 is sometimes referred to as a shared storage apparatus 330.

The data read-write module 302 is configured to read data required by the CNN training process from a storage apparatus/device (also referred to as an off-chip storage apparatus/device) external to the deep learning processing apparatus 220 and store the data to storage apparatus 330. The data conversion module 303 is configured to read to-be-converted data from the storage apparatus 330 and perform format conversion on the data, such as reshaping of the elements in the data (for example, converting the data from a three-dimensional or higher-dimensional matrix to a two-dimensional matrix form, or converting the matrix to a vector). The converted data is stored in the storage apparatus 330 again.

The matrix calculation module 301 is configured to perform matrix calculation operations involved in the CNN training process, and the vector calculation module 304 is configured to perform vector calculation operations involved in the CNN training process. The pooling module 305 is configured to perform operations related to the pooling layer in CNN, and the transposition module 306 is configured to perform matrix transposition operations involved in the CNN training process. In some embodiments, the operations related to the pooling layer and the transposition operations may also be converted to corresponding matrix calculation operations and vector calculation operations, thereby being implemented by the matrix calculation module 301 and the vector calculation module 304. The storage apparatus 330 may be, for example, an on-chip random access memory (RAM), such as a static random access memory (SRAM) or other types of memory. The matrix calculation module 301, the vector calculation module 304, and possibly the pooling module 305 and the transposition module 306 may all access the storage apparatus 330 to read to-be-processed data therefrom and write the processed data to the storage apparatus 330. Therefore, the storage apparatus 330 is sometimes referred to as a shared storage apparatus 330.

Hereinafter, in order to better understand the specific operations of the matrix multiply-add module 310 and the matrix accumulation module 320 in the matrix calculation module 301 in the convolutional inverse operation of the convolutional layer in CNN, reference will be made to FIG. 4A and FIG. 4B to briefly introduce the convolution operation and the convolution inverse operation of the convolutional layer.

Figure 4A:
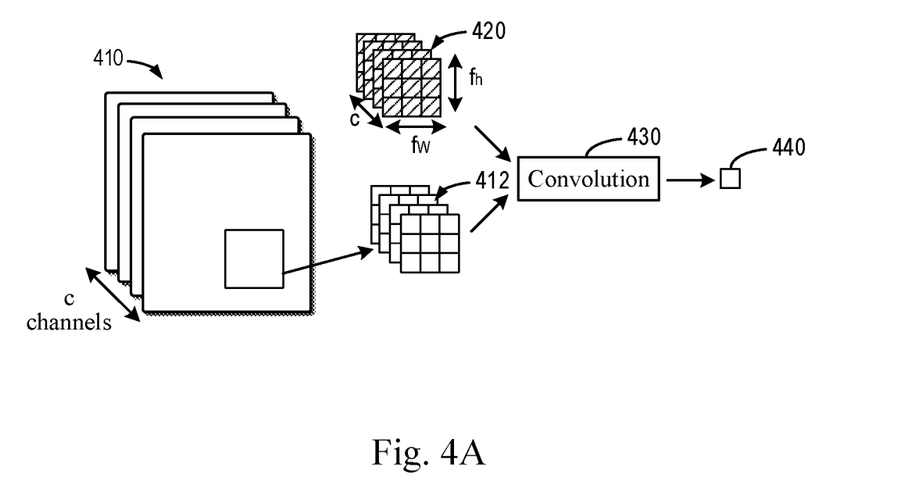
FIG. 4A shows a schematic diagram of a convolution operation of a convolutional layer in CNN.
Figure 4B:
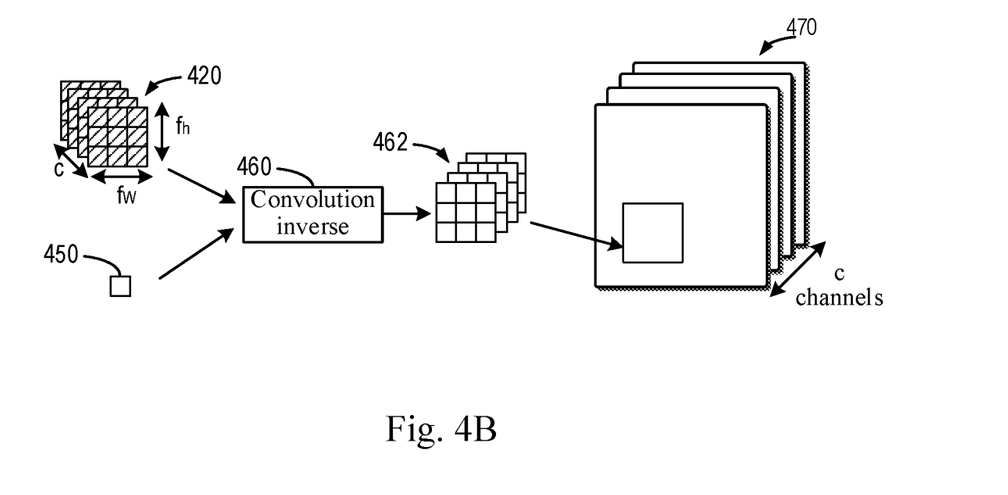
FIG. 4B shows a schematic diagram of a convolution inverse operation of a convolutional layer in CNN.

FIG. 4A shows a convolution operation of a convolutional layer. The convolution operation occurs in a forward calculation of CNN. For a convolutional layer in CNN, the to-be-processed input comes from an output of the previous layer or from the input layer of CNN. The input of the convolutional layer generally includes one or more feature maps 410, and each feature map may be represented as a two-dimensional matrix. The number of the input feature maps 410 is the number of input channels (assuming c channels).

The convolutional layer includes one or more convolution kernels 420 for implementing the convolution operation. The number of the convolution kernels 420 may be arbitrarily configured in CNN (assuming that the number of convolution kernels is "k"). The size of each convolution kernel 420 is assumed to be $c*f_h*f_w$, where c is the number of channels, and $f_h*f_w$ represents the height and width of the convolution kernel. That is, each convolution kernel 420 may be represented as a convolution kernel parameter value matrix of $c*f_h*f_w$. In the forward processing of the training process, the convolution kernel parameter value matrix is the value determined at the current stage of training. When performing the convolution operation, each convolution kernel 420 moves on the input feature map 410 of the convolutional layer according to the scheme of the convolution operation, for example, it may move from left to right and from top to bottom on the feature map at a certain pace, perform the convolution operation on the obtained elements, and finally obtain an output feature map of the convolutional layer. The convolution operation may be expressed as:

$$[O_h*O_w,c*f_h*f_w]*[c*f_h*f_w,k]=[O_h*O_w,k] \quad \text{formula (1)}$$

Here $O_h$ represents the height of the output of the convolutional layer, $O_w$ represents the width of the output of the convolutional layer, and k represents the number of convolution kernels. According to formula (1), the size of the output feature map of the convolutional layer is $k*O_h*O_w$, which may be represented as k two-dimensional matrices $O_h*O_w$.

In the convolution operation, an input sub-matrix (also referred to as input window) of $c*f_h*f_w$ is extracted from the input feature map 410 each time, which includes $c*f_h*f_w$ input elements for multiplying the convolution kernel parameter value matrix (size $c*f_h*f_w$) of each of the k convolution kernels 420. The multiplication of the input sub-matrix of $c*f_h*f_w$ with the convolution kernel parameter value matrix of $c*f_h*f_w$ may sometimes be represented as matrix multiplication of c two-dimensional matrices of $f_h*f_w$ in the input elements and c two-dimensional matrices of $f_h*f_w$ of the convolution kernel parameter value matrix (of course, matrix multiplication may be performed after converting these two three-dimensional sub-matrices to two-dimensional matrices of other sizes).

According to the scheme of the convolution operation, assuming that the convolution kernel may extract $O_h*O_w$ windows on the input feature map 410 to perform the convolution operation. FIG. 4A shows that the convolution operation 430 is performed on an input window 412 with size of $c*f_h*f_w$ extracted from one of the c input feature maps 410 and the convolution kernel parameter value matrix of a convolution kernel 420 with size of $c*f_h*f_w$, to obtain an output element 440 in the output feature map of the convolutional layer. If there are a plurality of convolution kernels 420, each convolution kernel performs similar processing. The convolution operation 430 is a matrix multiply-add operation that may be decomposed into multiplication and addition operations of matrix elements. In the matrix calculation module 301, the matrix multiply-add module 310 may perform the convolution operation. In some embodiments, the convolution operation of the convolutional layer shown in formula (1) may be divided into corresponding matrix multiply-add operations in forward convolution, implemented by the matrix multiply-add module 310. For example, the matrix multiplication of $O_h*O_w$ input sub-matrices in the input feature map 410 and the convolution kernel parameter value matrix of the convolution kernel may be decomposed into $O_h$ calculations, and each time, $1*O_w$ output elements in the output feature map of the convolutional layer are calculated.

The forward convolution operation of the convolutional layer is introduced above. The convolution inverse operation of the convolutional layer is the inversion of the above convolution operation. The convolution inverse operation of the convolutional layer is shown in FIG. 4B. In the inverse processing, for a specific convolutional layer in CNN, an error gradient value matrix (referred to herein as "first error gradient value matrix") for a subsequent layer of the convolutional layer (the subsequent layer viewed from the forward direction of CNN, for example, the subsequent layer of the convolutional layer 220 in FIG. 1 is the activation layer 130) may be calculated. The size of the first error gradient value matrix is the same as the size of the output feature map of the convolutional layer, that is, $k*O_h*O_w$. The convolution inverse operation performs a convolution inverse operation on the first error gradient value matrix and the convolution kernel parameter value matrix of the convolutional layer (which may also be decomposed into multiplication and addition operations of matrix elements) to obtain a plurality of intermediate matrices. Then, the plurality of intermediate matrices is sequentially superimposed to the corresponding location of the input feature map of the convolutional layer to obtain an error gradient value matrix for the current convolutional layer (referred to herein as "second error gradient value matrix"). The convolution inverse operation of the convolutional layer may be expressed as:

$$[O_h*O_w,k]*[k,c*f_h*f_w]=[O_h*O_w,c*f_h*f_w] \quad \text{formula (2)}$$

Here $O_h$ represents the height of the first error gradient value matrix of the subsequent layer, $O_w$ represents the width of the error gradient value matrix, and k represents the number of channels of the error gradient value matrix (that is, the number of two-dimensional matrices $O_h*O_w$). According to formula (2), it can be seen that after each convolution kernel $c*f_h*f_w$ is multiplied by the corresponding element in the first error gradient value matrix, the error gradient products of the k channels need to be accumulated together.

In the convolution inverse operation, for a convolution kernel 420, an error gradient value 450 is extracted from the first error gradient value matrix each time, and the error gradient value 450 is used with the convolution kernel parameter value matrix of $c*f_h*f_w$ to perform convolution inverse operation 460. For the k convolution kernels 420, in the convolution inverse operation 460, the products of error gradients of the k channels in the first error gradient value matrix with the convolution kernel parameter value matrix are added together to obtain an intermediate matrix 462. The convolution inverse operation 460 may also be implemented by the matrix multiply-add module 310. The convolution inverse operation 460 may also be regarded as a matrix multiply-add operation, which may be decomposed into multiplication and addition operations of matrix elements.

In some embodiments, if the matrix calculation module 301 includes a plurality of matrix multiply-add modules 310, when performing the matrix multiply-add operation of the convolution kernel parameter value matrix and the first error gradient value matrix, the plurality of matrix multiply-add modules 310 may perform the matrix multiply-add operation in parallel. The matrix multiply-add operation of $[O_h*O_w, k]*[k, c*f_h*f_w]$ may be decomposed into a matrix multiply-add calculation of two-dimensional matrices of any size.

It is assumed that after the matrix multiply-add operation, a plurality of intermediate matrices 462 are obtained, including $O_h*O_w$ intermediate matrices of size $c*f_h*f_w$. These intermediate matrices are not a final result of the convolution inverse operation, and need to be accumulated according to the convolution scheme of the convolutional layer. In an example embodiment of the present disclosure, a plurality of matrix accumulation modules 320 implement the matrix accumulation operation of a plurality of intermediate matrices in parallel. The convolution scheme of the convolutional layer depends on how the convolution kernel extracts an input window in the input feature map of the convolutional layer in the convolution operation, including the moving approach (for example, from left to right, from top to bottom) and the moving pace (for example, the window moves one element or other predetermined number of elements at a time) of the convolution kernel.

Figure 5:
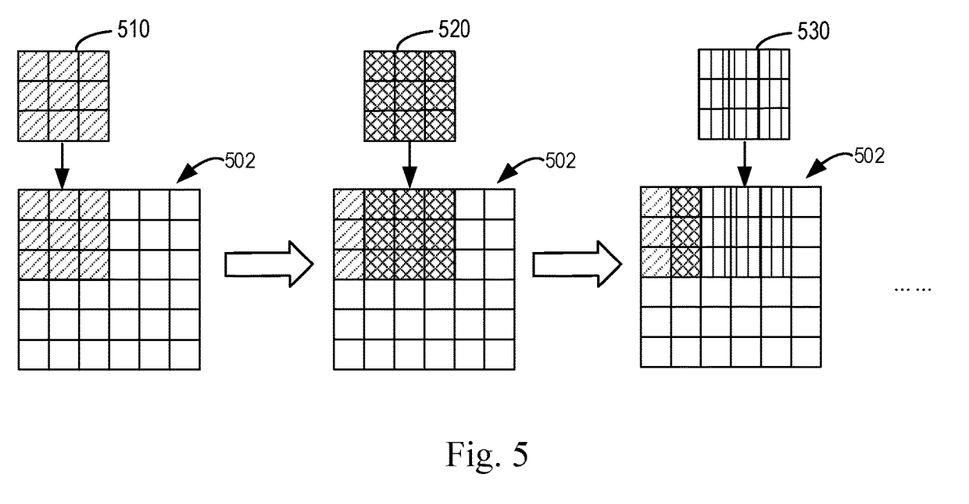
FIG. 5 schematically illustrates a matrix accumulation process according to some example embodiments of the present disclosure.

FIG. 5 shows an accumulation method of a plurality of intermediate matrices. In the example of FIG. 5, for ease of illustration, it is assumed that the number of channels c=1. FIG. 5 shows that a second error gradient value matrix is obtained by superimposing the plurality of intermediate matrices (size $f_h*f_w$). If the number of channels is greater than 1, for each channel, there are $O_h*O_w$ two-dimensional matrices of $f_h+f_w$, which may be superimposed accordingly to obtain a channel matrix. The finally obtained c channel matrixes are used as the second error gradient value matrix.

As shown in FIG. 5, if a first intermediate matrix 510 is calculated by the matrix multiply-add module 310, it may be accumulated to a first position (upper left corner position) of a second error gradient value matrix 502 having initial values. Assuming that the intermediate matrix 510 is a matrix including 3*3 elements, it is accumulated to a sub-matrix of 3*3 elements in the upper left corner of the initial two-dimensional matrix 502. During the matrix accumulation operation of the matrix accumulation module 320, the second error gradient value matrix initially has all zero values and is stored in a target storage location of the storage apparatus 330. The matrix accumulation module 320 is configured to read the corresponding to-be-accumulated initial values in the second error gradient value matrix 502 from the target storage location of the storage apparatus 330, and accumulate the elements in the intermediate matrix 510 to the corresponding initial values of the second error gradient value matrix 502. An accumulation result is written back to the target storage location of the storage apparatus 330. The storage location of the elements of the second error gradient value matrix 502 remains unchanged in the storage apparatus 330.

If a second intermediate matrix 520 is calculated by the matrix multiply-add module 310, it may be accumulated by the matrix accumulation module 320 to a second position of the second error gradient value matrix, which is shifted to the right by one element relative to the first position (assuming that the pace of the convolution kernel 420 is one element). Some elements of the intermediate matrix 520 continue to be accumulated with elements of the second error gradient value matrix 502 to which part of the elements of the intermediate matrix 510 have been accumulated, and some elements accumulate with the initial value (i.e., zero) of the second error gradient value matrix. The matrix accumulation module 320 may read the elements to be accumulated with the second intermediate matrix 520 from the storage apparatus 330.

If a third intermediate matrix 530 is calculated by the matrix multiply-add module 310, it may also be accumulated in a similar method to a corresponding sub-matrix of the second error gradient value matrix 502, and each element in the intermediate matrix 530 is accumulated with the accumulation value or initial value in the corresponding location. After $O_h*O_w$ intermediate matrices of size $f_h*f_w$ are superimposed, a superimposed result forms the final second error gradient value matrix.

In an embodiment of the present disclosure, as mentioned above, after the matrix multiply-add module 310 calculates to obtain the intermediate matrix, the intermediate matrix may be stored to the storage apparatus 330 without reshaping the elements in the intermediate matrix, that is, the intermediate matrix may still be stored in accordance with an element sorting method generated by the matrix multiply-add module 310 without being reshaped or divided into other representations.

In some embodiments, each matrix accumulation module 320 may perform an accumulation operation of an intermediate matrix in each matrix accumulation operation, and a plurality of matrix accumulation modules 320 may perform the accumulation operation in parallel. Since the second error gradient value matrix is stored in a specific storage location of the storage apparatus 330, and the intermediate matrix calculated by the matrix multiply-add module 310 does not need to be reshaped upon storing, the matrix accumulation module 320 may quickly accumulate the intermediate matrix directly to the current value of a corresponding matrix element of the second error gradient value matrix stored in the storage apparatus 330 when each intermediate matrix is determined, without serially accumulating in sequence each intermediate matrix (the order here refers to the convolution scheme of the convolution kernel, that is, the moving approach and pace of the convolution kernel on the input feature map). For example, in the example of FIG. 5, if the second intermediate matrix 520 is calculated first, the intermediate matrix 520 is directly superimposed on the element having the initial value in the corresponding location of the second error gradient value matrix 502, even if the first intermediate matrix 510 has not been accumulated.

In some embodiments, the loop control module 354 may be configured to control the matrix accumulation operation of the matrix accumulation module 320 to avoid that the plurality of matrix accumulation modules 320 simultaneously accumulate the same element position in the second error gradient value matrix. Such parallel matrix accumulation may further improve the calculation speed of the convolution inverse operation, and is particularly suitable when there are a plurality of matrix multiply-add modules 310 and these matrix multiply-add modules 310 perform matrix multiply-add operations in parallel, because in this case it is possible that some matrix multiply-add modules 310 may output an intermediate matrix faster.

In some embodiments, in the parallel matrix accumulation process, if an input of the convolutional layer has a plurality of channels, this means that the second error gradient value matrix includes a plurality of channel matrices for the plurality of channels (each channel matrix is a two-dimensional matrix, such as a two-dimensional matrix 502 in FIG. 5), a plurality of matrix accumulation modules 320 may be configured to perform matrix accumulation operations in parallel according to the plurality of channels. The plurality of matrix accumulation modules 320 may implement a plurality of parallel paths corresponding to the plurality of channels, and there may be one or more matrix accumulation modules 320 in each parallel path to perform the matrix accumulation operation. The matrix accumulation module 320 on each parallel path is configured to perform accumulation of an intermediate matrix associated with one channel of the plurality of channels in the plurality of intermediate matrices, thereby obtaining the channel matrix for the channel.

In some embodiments, a parallel matrix accumulation operation may be implemented according to an intermediate matrix, rather than divided according to channels. Each matrix accumulation module 320 is configured to accumulate one of the plurality of intermediate matrices to an intermediate result for one of the plurality of channel matrices in each accumulation.

Figure 6:
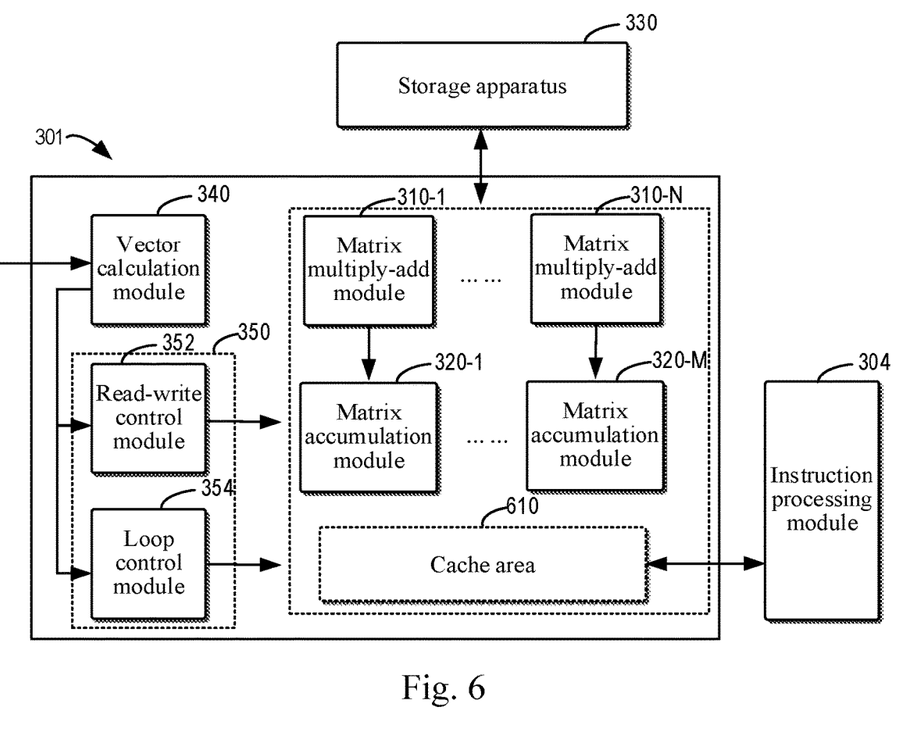
FIG. 6 is a block diagram illustrating an example structure of a matrix calculation module according to some other example embodiments of the present disclosure.

In some embodiments, the matrix calculation module 301 may further include a cache area (sometimes referred to herein as "second cache area"). In the process of matrix multiply-add operation and matrix accumulation operation of two matrices, many intermediate operation results may be generated, and these intermediate operation results may be called again in later operations. Therefore, setting the cache area in the module may effectively reduce the data transfer between the matrix calculation module 301 and the storage apparatus 330, thereby further improving the matrix multiply-add operation speed, and reducing power consumption. FIG. 6 shows such an embodiment. As shown in FIG. 6, the matrix calculation module 301 further includes a cache area 610 configured to cache an intermediate operation result (sometimes referred to as "first intermediate operation result") generated by the at least one matrix multiply-add module 310 during the matrix multiply-add operation, and/or intermediate operation results (sometimes referred to as "second intermediate operation results") generated by the plurality of matrix accumulation modules 320 during the matrix accumulation operation.

In the matrix calculation process of the matrix multiply-add module 310 and the matrix accumulation module 320, a vector calculation function of the vector calculation module 304 of the deep learning processing apparatus 220 may also be used, which may avoid a complexity increase caused by the corresponding function involved in the matrix calculation module 301. In some embodiments, the vector calculation module 304 may be configured to help the matrix calculation module 301 perform zero-setting and/or data reading and writing operations on the cache area 610 at the vector level, as shown in FIG. 6.

In some embodiments, the vector calculation module 304 may be configured to zero a storage area in the cache area 610 for storing the intermediate operation result of the matrix multiply-add module 310 and/or the intermediate operation result of the matrix accumulation module 320 at the vector level. That is, the vector calculation module 304 may set the storage area corresponding to the intermediate operation result to zero by row or column. Alternatively or additionally, the vector calculation module 304 may further be configured to write a final operation result of the matrix accumulation operation performed by each matrix accumulation module 320 selectively to the storage apparatus 330 as at least a part of the second error gradient value matrix at the vector level. This is to solve the situation in which filling elements may be added during the convolution. In the convolution inverse operation, the filling elements added in the forward direction need to be deleted so that the filling elements are not used as elements in the final error gradient value matrix. The vector calculation module 304 may better filter the filling elements of the matrix row by row or column by column at the vector level.

The processing of the vector calculation module 304 may be controlled by a control signal, and such a control signal may be determined by parsing a customized deep learning related instruction set. It should be understood that in other embodiments, instead of using function of the vector calculation module 304, a corresponding function may be configured in the matrix calculation module 301 to implement zero setting and selective writing of data in the cache area.

In some embodiments, if the matrix accumulation module 320 needs to read and write the storage apparatus 330 when performing the matrix accumulation operation, there may be a "data hazard" situation due to a certain delay between the matrix accumulation operation and data reading and writing. When the matrix accumulation module 320 performs data accumulation, it may be necessary to accumulate a plurality of elements sequentially, and an accumulation result is stored in the same storage location of the storage apparatus 330. For example, for an element in the second error gradient value matrix finally obtained, it may be a result of accumulating elements in two or more intermediate matrices. The "data hazard" situation refers to the situation where the accumulation of the current two elements must be performed by waiting for the accumulation of the previous two elements to complete, thereby causing a data accumulation pipeline to stop.

Figure 7:
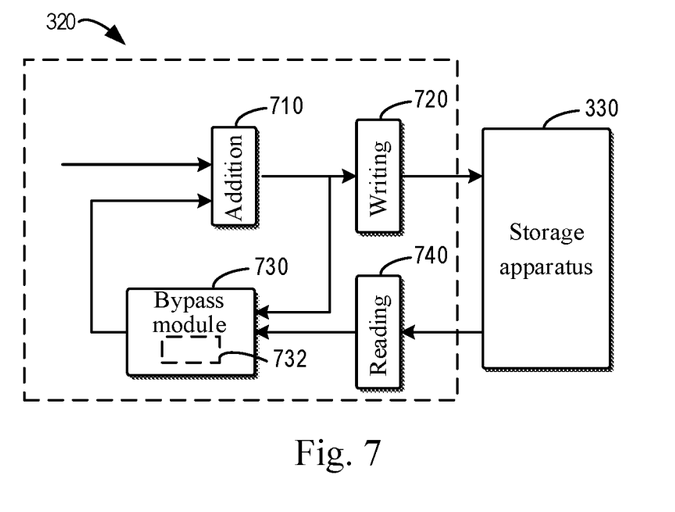
FIG. 7 is a block diagram illustrating an example structure of a matrix accumulation module according to some other example embodiments of the present disclosure.

In some embodiments, it is proposed to use a bypass mechanism in the matrix accumulation module 320 to solve the "data hazard" problem. FIG. 7 shows an example structure of the matrix accumulation module 320 according to some embodiments of the present disclosure. As shown in FIG. 7, the matrix accumulation module 320 includes an addition operation unit 710, configured to perform accumulation of two elements in to-be-superimposed matrices to obtain an accumulated element. The addition operation unit 710 may be, for example, a floating-point addition operation unit, or an addition operation unit in any other format. The matrix accumulation module 320 further includes a data writing unit 720, configured to write the accumulated element calculated by the addition operation unit 710 to a corresponding storage location of the storage apparatus 330. The matrix accumulation module 320 further includes a data reading unit 740, configured to read the accumulated element from the corresponding storage location of the storage apparatus 330 for subsequent accumulation with the next element.

In the matrix accumulation operation, the addition operation unit 710 may need to perform accumulation of more than two elements, and the accumulation result of two elements may continue to be accumulated with the next element each time, until the accumulation of all elements is completed. The to-be-accumulated matrices may be an intermediate matrix and a sub-matrix in the second error gradient value matrix to which the intermediate matrix is to be accumulated, and the matrix elements thereof are usually have been calculated already. However, since there is a certain delay between the data reading and writing of the data writing unit 720 to the storage apparatus 330 and the operation of the addition operation unit 710, in some cases, when the data writing unit 720 is writing the accumulated element after the accumulation of the first element and the second element calculated by the addition operation unit 710 to the storage apparatus 330, a next to-be-accumulated third element may have been prepared already. In the conventional scheme, it may also need to wait for the data writing unit to continue to write the accumulated element, then activate the data reading unit and then read the accumulated element from the corresponding storage location to provide to the addition operation unit to perform the accumulation, which leads to the "data hazard" problem, thereby introducing large delay.

In an embodiment of FIG. 7, the matrix accumulation module 320 includes a bypass module 730, configured to cache the accumulated element calculated by the addition operation unit 710 to a cache area 732 (sometimes referred to as "first cache area"). The writing speed of the cache area 732 is generally higher than the writing speed of the storage apparatus 330. If a "data hazard" occurs, that is, when it is determined that the addition operation unit is to perform accumulation of the third element and the previous accumulated element, the accumulated element still cannot be read from the corresponding storage location of the storage apparatus 330, the bypass module 730 is configured such that the accumulated element cached in the cache area 732 is provided to the addition operation unit 710. As such, the addition operation unit 710 may quickly perform further accumulation of the third element and the accumulated element when the third element is available. In some cases, if it is determined that no "data hazard" has occurred, that is, the data reading unit 740 may read the accumulated element from the storage apparatus 330 in time, the bypass module 730 may provide the accumulated element read from the storage apparatus 330 to the addition operation unit 710 for accumulation.

The cache time of the accumulated element in the cache area 732 may be a plurality of clock cycles of the deep learning processing apparatus 220. The specific time to be cached may depend on the size of the cache area 732 and/or the length of delay that may lead to "data hazard" (that is, the cache time is greater than the length of delay). This delay length generally depends on the operation delay of the addition operation unit 710, the data writing delay of the data writing unit 720, and the data reading delay of the data reading unit 740. In some embodiments, if the time difference between the time when the accumulated element is calculated and cached in the cache area 732 and the arrival time of the third element is less than the delay length, it may be determined that in this regard, the accumulated element cannot be read from the storage apparatus 330 when the addition operation unit 710 is to perform the accumulation of the third element and the accumulated element, therefore, the accumulated element in the cache area 732 may be provided to the addition operation unit 710 as the input.

Figure 8:
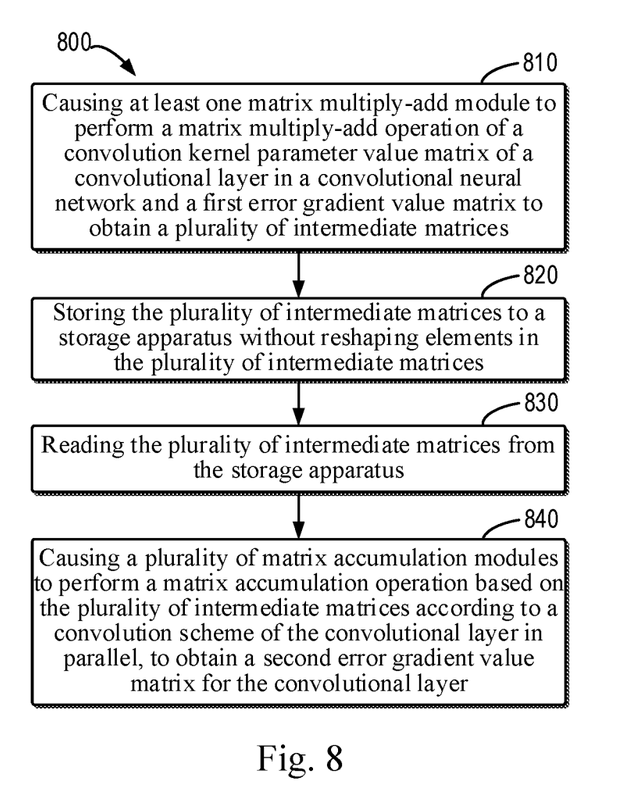
FIG. 8 schematically shows a flowchart of a method for performing a processing task according to an example embodiment of the present disclosure.

Hereinafter, more details of example embodiments of the present disclosure will be described with reference to FIG. 8. FIG. 8 schematically shows a flowchart of a method 800 for performing deep learning processing according to an example embodiment of the present disclosure. The method 800 is at least partially implemented by the deep learning processing apparatus 220.

At 810, the deep learning processing apparatus 220 causes at least one matrix multiply-add module to perform a matrix multiply-add operation of a convolution kernel parameter value matrix of a convolutional layer in a convolutional neural network and a first error gradient value matrix to obtain a plurality of intermediate matrices. At 820, the deep learning processing apparatus 220 stores the plurality of intermediate matrices to a storage apparatus without reshaping elements in the plurality of intermediate matrices. At 830, the deep learning processing apparatus 220 reads the plurality of intermediate matrices from the storage apparatus. At 840, the deep learning processing apparatus 220 causes a plurality of matrix accumulation modules to perform a matrix accumulation operation based on the plurality of intermediate matrices according to a convolution scheme of the convolutional layer in parallel, to obtain a second error gradient value matrix for the convolutional layer.

In some embodiments, the plurality of intermediate matrices are associated with a plurality of channels of an input of the convolutional layer, and the second error gradient value matrix includes a plurality of channel matrices for the plurality of channels. In some embodiment, causing the plurality of matrix accumulation modules to perform the matrix accumulation operation based on the plurality of intermediate matrices according to the convolution scheme of the convolutional layer in parallel includes at least one of: causing each matrix accumulation module in the plurality of matrix accumulation modules to accumulate an intermediate matrix, in the plurality of intermediate matrices, associated with a channel of the plurality of channels, on a parallel path of a plurality of parallel paths corresponding to the plurality of channels to obtain the channel matrix for the channel; or causing each matrix accumulation module in the plurality of matrix accumulation modules to accumulate, at each accumulation, one of the plurality of intermediate matrices to an intermediate result for one of the plurality of channel matrices.

In some embodiments, causing the plurality of matrix accumulation modules to perform the matrix accumulation operation based on the plurality of intermediate matrices according to the convolution scheme of the convolutional layer in parallel includes causing at least one matrix accumulation module of the plurality of matrix accumulation modules to: accumulating a first element and a second element to obtain an accumulated element; writing the accumulated element to the storage apparatus; caching the accumulated element to a first cache area, a writing speed of the first cache area being faster than a writing speed of the storage apparatus, the accumulated element being cached in the first cache area for a plurality of clock cycles; and causing the accumulated element cached in the first cache area to be provided for accumulation with the third element, in response to determining that the accumulated element cannot be read from the storage apparatus when the addition operation unit is to perform accumulation of a third element and the accumulated element.

In some embodiments, the deep learning processing apparatus 220 further caches a first intermediate operation result generated by the at least one matrix multiply-add module during the matrix multiply-add operation and second intermediate operation results generated by the plurality of matrix accumulation modules during the matrix accumulation operation to a second cache area.

In some embodiments, the deep learning processing apparatus 220 further causes a vector calculation module of the deep learning processing apparatus to perform at least one of: zeroing a storage area for storing the first intermediate operation result and the second intermediate operation results in the second cache area at a vector level; and writing a final operation result of the matrix accumulation operation selectively to the storage apparatus of the deep learning processing apparatus as at least a part of the second error gradient value matrix at the vector level.

In some embodiments, the deep learning processing apparatus 220 further acquires an instruction set for a convolution direction operation of the convolutional layer in the CNN from a general-purpose processing apparatus and parses the instruction set; and generates a control signal for the at least one matrix multiply-add module and the plurality of matrix accumulation modules based on the parsed instruction set.

In some embodiments, the at least one matrix multiply-add module includes a plurality of matrix multiply-add modules, and causing the at least one matrix multiply-add module to perform the matrix multiply-add operation includes: causing the plurality of matrix multiply-add modules to perform the matrix multiply-add operation in parallel.

Figure 9:
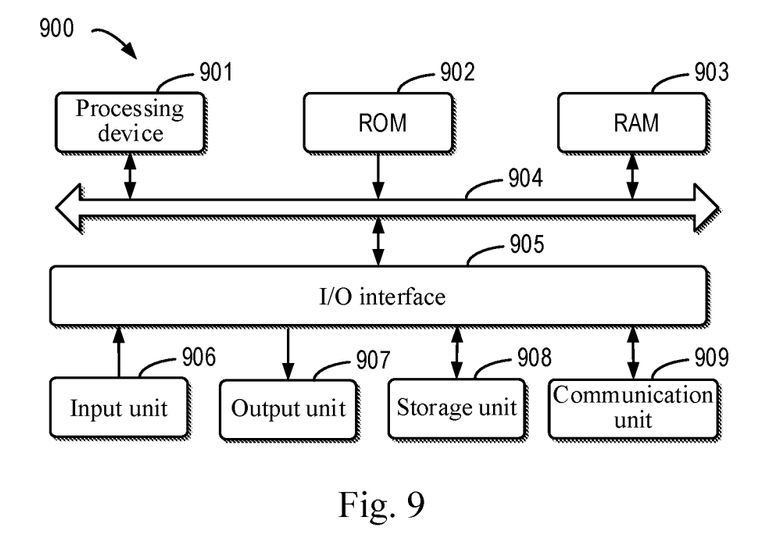
FIG. 9 shows a block diagram of a computing device capable of implementing various embodiments of the present disclosure.

FIG. 9 shows a schematic block diagram of a computing device 900 that can be used to implement embodiments of the present disclosure. As shown in the figure, the device 900 includes a processing device 901, which can execute various appropriate actions and processes according to computer program instructions stored in a read-only memory (ROM) 902 or computer program instructions loaded from a storage unit 908 into a random access memory (RAM) 903. The processing device 901 may include one or more deep learning processing apparatuses 220 described in the present disclosure. The processing device 901 may also include one or more general-purpose processing apparatuses 210.

In the RAM 903, various programs and data required for the operation of the computing device 900 may also be stored. The processing device 901, the ROM 902, and the RAM 903 are connected to each other through a bus 904. An input/output (I/O) interface 905 is also connected to the bus 904.

Various components in the device 900 are connected to the I/O interface 905, including: an input unit 906, such as a keyboard, a mouse; an output unit 907, such as various types of displays, speakers; the storage unit 908, such as a magnetic disk, an optical disc; and a communication unit 909, such as a network card, a modem, a wireless communication transceiver. The communication unit 909 allows the device 900 to exchange information/data with other devices through a computer network such as the Internet and/or various telecommunication networks.

The processing device 901 may be various general-purpose and/or dedicated processing components having processing and computing capabilities. Some examples of the processing device 901 include but are not limited to central processing units (CPU), graphics processing units (GPU), various dedicated artificial intelligence (AI) computing chips, various computing units running machine learning model algorithms, digital signal processors (DSP), and any suitable processors, controllers, microcontrollers, etc. The processing device 901 performs the methods and processes described above, such as the method 800. For example, in some embodiments, the method 800 may be implemented as a computer software program, which is tangibly embodied on a machine readable medium, such as the storage unit 908. In some embodiments, part or all of the computer program may be loaded and/or installed on the device 900 via the ROM 902 and/or the communication unit 909. When the computer program is loaded into the RAM 903 and executed by the processing device 901, one or more steps of the method 800 described above may be performed. Alternatively, in other embodiments, the processing device 901 may be configured to perform the method 800 in any other suitable method (e.g., by means of firmware).

The functions described herein above may be performed, at least in part, by one or more hardware logic components. For example, and without limitation, exemplary types of hardware logic components that may be used include: Field Programmable Gate Array (FPGA), Application Specific Integrated Circuit (ASIC), Application Specific Standard Product (ASSP), System on Chip (SOC), Complex Programmable Logic Device (CPLD), and the like.

Program codes for implementing the method of the present disclosure may be written in any combination of one or more programming languages. These program codes may be provided to a processor or controller of a general purpose computer, special purpose computer or other programmable data processing apparatus such that the program codes, when executed by the processor or controller, enables the functions/operations specified in the flowcharts and/or block diagrams being implemented. The program codes may execute entirely on the machine, partly on the machine, as a stand-alone software package partly on the machine and partly on the remote machine, or entirely on the remote machine or server.

In the context of the present disclosure, the machine readable medium may be a tangible medium that may contain or store programs for use by or in connection with an instruction execution system, apparatus, or device. The machine readable medium may be a machine readable signal medium or a machine readable storage medium. The machine readable medium may include, but is not limited to, an electronic, magnetic, optical, electromagnetic, infrared, or semiconductor system, apparatus, or device, or any suitable combination of the foregoing. More specific examples of the machine readable storage medium may include an electrical connection based on one or more wires, portable computer disk, hard disk, random access memory (RAM), read only memory (ROM), erasable programmable read only memory (EPROM or flash memory), optical fiber, portable compact disk read only memory (CD-ROM), optical storage device, magnetic storage device, or any suitable combination of the foregoing.

In addition, although various operations are described in a specific order, this should not be understood that such operations are required to be performed in the specific order shown or in sequential order, or all illustrated operations should be performed to achieve the desired result. Multitasking and parallel processing may be advantageous in certain circumstances. Likewise, although several specific implementation details are included in the above discussion, these should not be construed as limiting the scope of the present disclosure. Certain features described in the context of separate embodiments may also be implemented in combination in a single implementation. Conversely, various features described in the context of a single implementation may also be implemented in a plurality of implementations, either individually or in any suitable sub-combination.

Although embodiments of the present disclosure are described in language specific to structural features and/or method logic actions, it should be understood that the subject matter defined in the appended claims is not limited to the specific features or actions described above. Instead, the specific features and actions described above are merely exemplary forms of implementing the claims.

What is claimed is:

1. A deep learning processing apparatus, comprising:
at least one processor; and
a storage device, communicated with the at least one processor,
wherein the storage device stores an instruction executable by the at least one processor to perform an operation for performing deep learning processing, the operation comprising:
performing a matrix multiply-add operation of a convolution kernel parameter value matrix of a convolutional layer in a convolutional neural network and a first error gradient value matrix to obtain a plurality of intermediate matrices;
storing, in the storage device or a storage apparatus, the plurality of intermediate matrices without reshaping elements in the plurality of intermediate matrices; and
reading, by a plurality of matrix accumulation modules, the plurality of intermediate matrices from the storage apparatus and perform a matrix accumulation operation based on the plurality of intermediate matrices according to a convolution scheme of the convolutional layer in parallel, to obtain a second error gradient value matrix for the convolutional layer.

2. The deep learning processing apparatus according to claim 1, wherein the plurality of intermediate matrices are associated with a plurality of channels of an input of the convolutional layer, and the second error gradient value matrix comprises a plurality of channel matrices for the plurality of channels,
the reading comprises:
accumulating an intermediate matrix, in the plurality of intermediate matrices, associated with a channel of the plurality of channels, on a parallel path of a plurality of parallel paths corresponding to the plurality of channels to obtain the channel matrix for the channel; or
accumulating, at each accumulation, one of the plurality of intermediate matrices to an intermediate result for one of the plurality of channel matrices.

3. The deep learning processing apparatus according to claim 1, further comprising:
storing the second error gradient value matrix in a target storage location, the second error gradient value matrix having an all zero value before the matrix accumulation operation; and
wherein the reading comprises:
accumulating the plurality of intermediate matrices in parallel with the second error gradient value matrix having an initial value stored in the target storage location.

4. The deep learning processing apparatus according to claim 1, wherein the reading comprises:
receiving a first element and a second element in to-be-accumulated matrices and accumulate the first element and the second element to obtain an accumulated element;
writing the accumulated element to the storage device or the storage apparatus;
caching, in a first cache area, the accumulated element, a writing speed of the first cache area being faster than a writing speed of the storage device or the storage apparatus, the accumulated element being cached in the first cache area for a plurality of clock cycles; and causing, in response to determining that the accumulated element cannot be read from the storage apparatus when performing accumulation of a third element and the accumulated element, the accumulated element cached in the first cache area to be provided to write the accumulated element to the storage device or the storage apparatus.

5. The deep learning processing apparatus according to claim 1, wherein the storage device or the storage apparatus comprises an on-chip random access memory.

6. The deep learning processing apparatus according to claim 1, further comprising:
caching, in a second cache area, a first intermediate operation result during the matrix multiply-add operation and cache second intermediate operation results during the matrix accumulation operation.

7. The deep learning processing apparatus according to claim 6, further comprising:
performing at least one of:
zeroing a storage area for storing the first intermediate operation result and the second intermediate operation results in the second cache area at a vector level; and
writing a final operation result of the matrix accumulation operation selectively to the storage device or the storage apparatus of the deep learning processing apparatus as at least a part of the second error gradient value matrix at the vector level.

8. The deep learning processing apparatus according to claim 1, further comprising:
acquiring an instruction set for a convolution direction operation of the convolutional layer in the CNN from a general-purpose processing apparatus and parse the instruction set; and
generating a control signal based on the parsed instruction set.

9. The deep learning processing apparatus according to claim 1, wherein the performing a matrix multiply-add operation comprises performing the matrix multiply-add operation in parallel.

10. A method for performing deep learning processing, comprising:
performing, by a deep learning processing apparatus, a matrix multiply-add operation of a convolution kernel parameter value matrix of a convolutional layer in a convolutional neural network and a first error gradient value matrix to obtain a plurality of intermediate matrices;
storing the plurality of intermediate matrices to a storage apparatus without reshaping elements in the plurality of intermediate matrices;
reading the plurality of intermediate matrices from the storage apparatus; and
causing a plurality of matrix accumulation modules of the deep learning processing apparatus to perform a matrix accumulation operation based on the plurality of intermediate matrices according to a convolution scheme of the convolutional layer in parallel, to obtain a second error gradient value matrix for the convolutional layer.

11. The method according to claim 10, wherein the plurality of intermediate matrices are associated with a plurality of channels of an input of the convolutional layer, and the second error gradient value matrix comprises a plurality of channel matrices for the plurality of channels, wherein performing the matrix accumulation operation based on the plurality of intermediate matrices according to the convolution scheme of the convolutional layer in parallel comprises at least one of:
accumulating an intermediate matrix, in the plurality of intermediate matrices, associated with a channel of the plurality of channels, on a parallel path of a plurality of parallel paths corresponding to the plurality of channels to obtain the channel matrix for the channel; or
accumulating, at each accumulation, one of the plurality of intermediate matrices to an intermediate result for one of the plurality of channel matrices.

12. The method according to claim 10, wherein performing the matrix accumulation operation based on the plurality of intermediate matrices according to the convolution scheme of the convolutional layer in parallel comprises:
accumulating a first element and a second element to obtain an accumulated element;
writing the accumulated element to the storage apparatus;
caching the accumulated element to a first cache area, a writing speed of the first cache area being faster than a writing speed of the storage apparatus, the accumulated element being cached in the first cache area for a plurality of clock cycles; and
causing the accumulated element cached in the first cache area to be provided for accumulation with the third element, in response to determining that the accumulated element cannot be read from the storage apparatus when performing accumulation of a third element and the accumulated element.

13. The method according to claim 10, further comprising:
caching a first intermediate operation result generated during the matrix multiply-add operation and second intermediate operation results generated during the matrix accumulation operation to a second cache area.

14. The method according to claim 13, further comprising:
zeroing a storage area for storing the first intermediate operation result and the second intermediate operation results in the second cache area at a vector level; and
writing a final operation result of the matrix accumulation operation selectively to the storage apparatus of the deep learning processing apparatus as at least a part of the second error gradient value matrix at the vector level.

15. The method according to claim 10, further comprising:
acquiring an instruction set for a convolution direction operation of the convolutional layer in the CNN from a general-purpose processing apparatus and parsing the instruction set; and
generating a control signal based on the parsed instruction set.

16. The method according to claim 10, wherein performing the matrix multiply-add operation comprises:
performing the matrix multiply-add operation in parallel.

17. A non-transitory computer readable storage medium, storing a computer program thereon, the program, when executed by a processor, implements the method according to claim 10.

* * * * *